United States Patent
Lian et al.

(10) Patent No.: US 12,384,039 B2
(45) Date of Patent: Aug. 12, 2025

(54) LEARNING TO ACQUIRE AND ADAPT CONTACT-RICH MANIPULATION SKILLS WITH MOTION PRIMITIVES

(71) Applicant: Intrinsic Innovation LLC, Mountain View, CA (US)

(72) Inventors: Wenzhao Lian, Fremont, CA (US); Stefan Schaal, Mountain View, CA (US); Zheng Wu, Albany, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 434 days.

(21) Appl. No.: 17/845,698

(22) Filed: Jun. 21, 2022

(65) Prior Publication Data

US 2022/0402140 A1 Dec. 22, 2022

Related U.S. Application Data

(60) Provisional application No. 63/212,481, filed on Jun. 18, 2021.

(51) Int. Cl.
*B25J 9/16* (2006.01)

(52) U.S. Cl.
CPC .......... *B25J 9/1687* (2013.01); *B25J 9/1661* (2013.01); *B25J 9/1664* (2013.01); *G05B 2219/39001* (2013.01)

(58) Field of Classification Search
CPC ...... B25J 9/1687; B25J 9/1661; B25J 9/1664; B25J 9/163; G05B 2219/39001; G05B 2219/39244; G05B 2219/39298; G05B 2219/40116
See application file for complete search history.

(56) References Cited

U.S. PATENT DOCUMENTS

| | | | |
|---|---|---|---|
| 9,840,007 B1* | 12/2017 | Kuffner | B25J 9/1671 |
| 10,668,623 B2* | 6/2020 | Zhang | B25J 9/1679 |
| 2015/0336268 A1* | 11/2015 | Payton | G05B 19/423 |
| | | | 901/3 |
| 2022/0088780 A1* | 3/2022 | Abdul-hadi | B25J 9/1664 |
| 2022/0184808 A1* | 6/2022 | Zheng | B25J 9/1666 |

(Continued)

OTHER PUBLICATIONS

Alt et al., "Robot program parameter inference via differentiable shadow program inversion." Submitted on Jul. 2022, arXiv:2103.14452v2, 7 pages.

(Continued)

*Primary Examiner* — Khoi H Tran
*Assistant Examiner* — Nhi Q Bui
(74) *Attorney, Agent, or Firm* — Fish & Richardson P.C.

(57) ABSTRACT

A computer-implemented method comprising, receiving data representing a successful trajectory for an insertion task using a robot to insert a connector into a receptacle, performing a parameter optimization process for the robot to perform the insertion task. This parameter optimization includes defining an objective function that measures a similarity of a current trajectory generated with a current set of parameters to the successful trajectory and repeatedly modifying the current set of parameters and evaluating the modified set of parameters according to the objective function until generating a final set of parameters.

21 Claims, 6 Drawing Sheets

(56) References Cited

U.S. PATENT DOCUMENTS

2022/0317659 A1* 10/2022 van Baar ............... B25J 13/088

OTHER PUBLICATIONS

Arkin et al., "An efficiently computable metric for comparing polygonal shapes" Cornell University Operations Research and Industrial Engineering, Jun. 1989, 22 pages.

Bohg et al., "Data-driven grasp synthesis—a survey." Submitted on Apr. 2016, arXiv:1309.2660v2, 21 pages.

Chu et al., "Learning affordance segmentation for real-world robotic manipulation via synthetic images." IEEE Robotics and Automation Letters 4.2, Jan. 2019, 8 pages.

Davchev et al., "Residual learning from demonstration: Adapting dynamic movement primitives for contact-rich insertion tasks" Submitted on Oct. 2020, arXiv:2008.07682v2, 11 pages.

Ester et al., "A density-based algorithm for discovering clusters in large spatial databases with noise." kdd. vol. 96. No. 34., Aug. 1996, 226-231.

Fang et al., "Learning task-oriented grasping for tool manipulation from simulated self-supervision." Submitted on Jun. 2018, arXiv:1806.09266v1, 11 pages.

Fischler et al., "Random sample consensus: a paradigm for model fitting with applications to image analysis and automated cartography." Communications of the ACM 24.6, Jun. 1981, 381-395.

Florence et al., "Dense object nets: Learning dense visual object descriptors by and for robotic manipulation." Submitted on Jun. 2018, arXiv:1806.08756v2, 12 pages.

Graham et al., "Submanifold sparse convolutional networks." Submitted on Jun. 2017, arXiv:1706.01307v1, 10 pages.

Gu et al., "Deep reinforcement learning for robotic manipulation with asynchronous off-policy updates." Submitted on Nov. 2016, arXiv:1610.00633v2, 9 pages.

Haarnoja et al., "Composable deep reinforcement learning for robotic manipulation" Submitted on Mar. 2018, arXiv:1803.06773v1, 10 pages.

Jiang et al., "Pointgroup: Dual-set point grouping for 3d instance segmentation." Proceedings of the IEEE/CVF conference on computer vision and Pattern recognition, 2020, 4867-4876.

Johannsmeier et al., "A framework for robot manipulation: Skill formalism, meta learning and adaptive control." Submitted on May 2018, arXiv:1805.08576v1, 8 pages.

Kalashnikov et al., "Scalable deep reinforcement learning for vision-based robotic manipulation." Conference on Robot Learning. PMLR, Oct. 2018, 23 pages.

Lee et al., "Making sense of vision and touch: Self-supervised learning of multimodal representations for contact-rich tasks." Submitted on Mar. 2019, arXiv:1810.10191v2, 8 pages.

Li et al., "Learning hierarchical control for robust in-hand manipulation." Submitted on Oct. 2019, arXiv:1910.10985v1, 8 pages.

Lian et al., "Benchmarking off-the-shelf solutions to robotic assembly tasks" Submitted on Mar. 2021, arXiv:2103.05140v1, 7 pages.

Liang et al., "PointNetGPD: Detecting grasp configurations from point sets" Submitted on Feb. 2019, arXiv:1809.06267v4, 7 pages.

Luo et al., "Robust multi-modal policies for industrial assembly via reinforcement learning and demonstrations: A large-scale study." Submitted on Jul. 2021, arXiv:2103.11512v4, 10 pages.

Mahler et al., "Dex-net 2.0: Deep learning to plan robust grasps with synthetic point clouds and analytic grasp metrics." Submitted on Aug. 2017, arXiv:1703.09312v3, 12 pages.

Mahler et al., "Learning ambidextrous robot grasping policies." Science Robotics 4.26, 2019, 12 pages.

Manuelli et al., "kPAM: Keypoint affordances for category-level robotic manipulation." Submitted on Oct. 2019, arXiv:1903.06684v2, 26 pages.

Miller et al., "Graspit! a versatile simulator for robotic grasping." IEEE Robotics & Automation Magazine 11.4, Dec. 2004, 110-122.

Monica et al., "Point cloud projective analysis for part-based grasp planning." IEEE Robotics and Automation Letters 5.3, Jun. 2020, 8 pages.

Montesano et al., "Learning object affordances: from sensory-motor coordination to imitation" IEEE Transactions on Robotics, 24(1), Feb. 2008, 15-26.

Morgan et al., "Vision-driven compliant manipulation for reliable, high-precision assembly tasks." Submitted on Jun. 2021, arXiv:2106.14070v1, 13 pages.

Murali et al., "6-dof grasping for target-driven object manipulation in clutter." Submitted on May 2020, arXiv:1912.03628v2, 7 pages.

Ni et al., "Pointnet++ grasping: Learning an end-to-end spatial grasp generation algorithm from sparse point clouds." 2020 IEEE International Conference on Robotics and Automation (ICRA). IEEE, May 2020, 7 pages.

Patten et al., "DGCM-net: dense geometrical correspondence matching network for incremental experience-based robotic grasping" Submitted on Jan. 2020, arXiv:2001.05279v1, 19 pages.

Peng et al., "Sim-to-real transfer of robotic control with dynamics randomization." Submitted on Mar. 2018, arXiv:1710.06537v3, 8 pages.

Perrone et al., "Learning search spaces for bayesian optimization: Another view of hyperparameter transfer learning" Submitted on Sep. 2019, arXiv:1909.12552v1, 17 pages.

PyBullet.org [online], "Pybullet a python module for physics simulation for games" Apr. 2021, retrieved on Aug. 7, 2023, retrieved from URL <https://pybullet.org/wordpress/index.php/2021/04/15/pybullet-in-a-colab/>, 2 pages.

Qi et al., "Pointnet: Deep learning on point sets for 3d classification and segmentation." Proceedings of the IEEE conference on computer vision and pattern recognition, 2017, 652-660.

Qin et al., "Keto: Learning keypoint representations for tool manipulation." Submitted on Oct. 2019, arXiv:1910.11977v2, 8 pages.

Rakelly et al., "Efficient off-policy meta reinforcement learning via probabilistic context variables" In International conference on machine learning, pp. 5331-5340. PMLR, May 2019, 10 pages.

Schoettler et al., "Deep reinforcement learning for industrial insertion tasks with visual inputs and natural rewards" Submitted on Aug. 2019, arXiv:1906.05841v2, 10 pages.

Schoettler et al., "Meta-reinforcement learning for robotic industrial insertion tasks." Submitted on May 2020, arXiv:2004.14404v2, 9 pages.

Suárez-Ruiz et al., "A framework for fine robotic assembly." Submitted on Sep. 2015, arXiv:1509.04806v1, 8 pages.

Ten Pas et al., "Grasp pose detection in point clouds." Submitted on Jun. 2017, arXiv:1706.09911v1, 17 pages.

Tobin et al., "Domain randomization for transferring deep neural networks from simulation to the real world." Submitted on Mar. 2017, arXiv:1703.06907v1, 8 pages.

Tremblay et al., "Deep object pose estimation for semantic robotic grasping of household objects." Submitted on Sep. 2018, arXiv:1809.10790v1, 11 pages.

Umeyama, "Least-squares estimation of transformation parameters between two point patterns." IEEE Transactions on Pattern Analysis & Machine Intelligence 13.04, Apr. 1991, 376-380.

Vecerik et al., "Leveraging demonstrations for deep reinforcement learning on robotics problems with sparse rewards" Submitted on Oct. 2018, arXiv:1707.08817v2, 10 pages.

Voigt et al., "Multi-Level Structure vs. End-to-End-Learning in High-Performance Tactile Robotic Manipulation." CoRL. 2020, 11 pages.

Vuong et al., "Learning sequences of manipulation primitives for robotic assembly" Submitted on Mar. 2021, arXiv:2011.00778v2, 7 pages.

Wang et al., "Normalized object coordinate space for category-level 6d object pose and size estimation." Proceedings of the IEEE/CVF Conference on Computer Vision and Pattern Recognition. 2019, 2642-2651.

Wen et al., "SE(3)-tracknet Data-driven 6d pose tracking by calibrating image residuals in synthetic domains" Submitted on Jul. 2020, arXiv:2007.13866v1, 7 pages.

Wu et al., "Learning dense rewards for contact rich manipulation tasks" Submitted on Nov. 2020, arXiv:2011.08458v1, 8 pages.

(56) References Cited

OTHER PUBLICATIONS

Yang et al., "Learning multi-object dense descriptor for autonomous goal-conditioned grasping." IEEE Robotics and Automation Letters 6.2, Feb. 2021, 4109-4116.

Zeng et al., "Multi-view self-supervised deep learning for 6d pose estimation in the amazon picking challenge." Submitted on May 2017, arXiv:1609.09475v3, 8 pages.

Zhao et al., "Towards robotic assembly by predicting robust, precise and task-oriented grasps." Conference on Robot Learning. PMLR, Oct. 2021, 11 pages.

\* cited by examiner

LEARNING TO ACQUIRE AND ADAPT CONTACT-RICH MANIPULATION SKILLS WITH MOTION PRIMITIVES

CROSS-REFERENCE TO RELATED APPLICATION

This application claims priority to U.S. Patent Application 63/212,481, filed on Jun. 18, 2021, entitled "Learning to Acquire and Adapt Contact-Rich Manipulation Skills with Motion Primitives," which is herein incorporated by reference.

BACKGROUND

This specification relates to robotics, and more particularly to planning robotic movements.

Robotics control refers to controlling the physical movements of robots in order to perform tasks. Robotic manipulation tasks require a robotic component, e.g., an end effector, to physically contact an object to effectuate some change in the object. For example, an industrial robot that builds cars can be programmed to first pick up a car part and then weld the car part onto the frame of the car.

Implementing robotic manipulation tasks has traditionally required immense amounts of manual programming in order to meticulously dictate how the robotic components should move in order to accomplish a particular task. For example, picking up a car part, moving it into place, and performing a weld can require hundreds or thousands of precise individual movements by robot motors and actuators. Manual programming is tedious, time-consuming, error prone, and not generalizable. In other words, a robotic plan manually generated for one workcell can generally not be used for other workcells or tasks.

Some research has been conducted toward using machine learning control algorithms, e.g., reinforcement learning, to control robots to perform particular tasks. However, robots have a number of drawbacks that make traditional learning approaches generally unsatisfactory. First, robots naturally have a very complex, high-dimensional, and continuous action space. Thus, it is computationally expensive to generate and evaluate all possible candidate actions. Secondly, robotic control is an environment with extremely sparse rewards because most possible actions do not result in completing a particular task. This is especially true for very complex tasks.

An additional complication is that traditional techniques for using machine learning for robotic control are extremely brittle and do not generalize well. This means that even if a workable model is successfully trained, even very tiny changes to the task, the robot, or the environment can cause the entire model to become completely unusable. To adapt a previously trained model to a new task typically requires additional collection of data, many hours or weeks of retraining, and possibly human alterations to the model itself.

SUMMARY

This specification describes technologies relating to learning generalizable robotic skills in a data-efficient manner by adapting manipulation skills using motion primitives. In general, a system can learn and adapt manipulation skills using optimization, optionally leveraging prior experiences similar to the task of interest, to learn and adapt the motion primitive parameters. Human demonstrations can be modeled to serve as dense rewards to guide the parameter learning.

Particular embodiments of the subject matter described in this specification can be implemented so as to realize one or more of the following advantages. The techniques described in this specification allow a robotic control system to efficiently learn to perform and generalize tasks. In some cases, the learning and generalization framework described in this specification can effectively and efficiently i) learn to acquire manipulation skills with about 40 iterations (less than an hour) training on a real robot and ii) generalize the learned manipulation skills to unseen tasks with as few as 15 iterations (less than 15 minutes) on average.

In addition, the tasks can be learned by searching for the optimal primitive parameters in a pre-defined range to minimize the task completion time. The designed manipulation policy composes learnable motion primitives leveraging impedance control. The training process is more effective because the system can use a dense objective function from task demonstrations by modeling the execution trajectories.

The techniques described in this specification can also be used for task generalization using a task library. The system can retrieve similar tasks from a task library by leveraging task meta information and can adapt the previously learned parameters to the novel task with few interactions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a data-efficient framework to learn and generalize manipulation skills based on motion primitives. This can be completed through a dense objective function that measures the likelihood of the induced execution trajectory being sampled from the same distribution as successful task demonstrations. In some implementations, the successful task demonstrations are driven by human demonstrations.

This model-based objective function can provide dense rewards even when a task execution trial fails. This approach essentially encourages the optimizer to select parameters inducing execution trajectories that are more similar to successful demonstrations, thus navigating the parameter space more efficiently. In other words, the dense objective function requires far less data to optimize the trajectory relative to prior art techniques that have only sparse rewards and therefore require far more data to encounter even a single successful iteration.

In addition, the insertion skill optimized in accordance with this specification is generalizable to novel tasks by using an introduced task similarity metric. For example, hole geometry information can be extracted from insertion tasks, and the difference between turning functions of two hole shapes is used as the task similarity metric. This approach can alleviate the problem of requiring domain expertise to carefully set parameter ranges for novel tasks.

Figure 1:
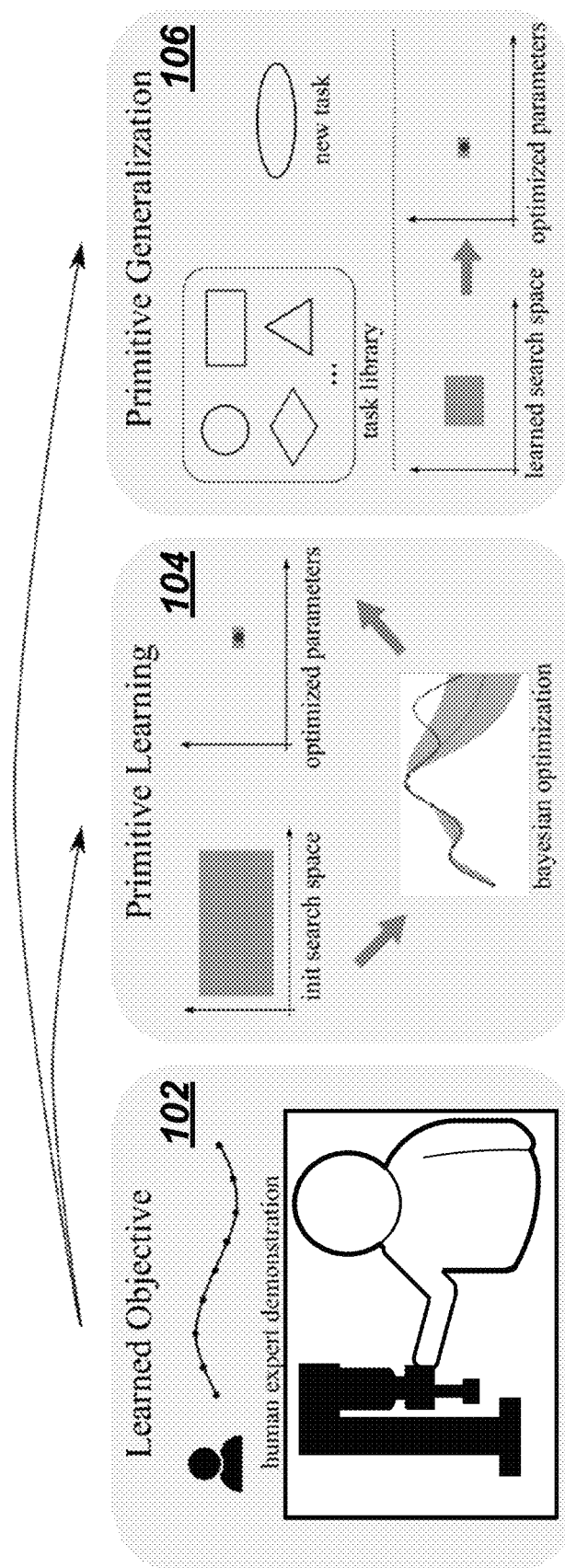
FIG. 1 is an overview of the primitive learning and generalization framework.

FIG. 1 illustrates an overview of an example learning and generalization framework.

During a learned objective phase 102, human demonstrations can provide initial trajectories to a robot for certain motion primitives. During a primitive learning phase 104, the system can evaluate differences between the human trajectories in order to optimize parameters for the motion primitive. During a primitive generalization phase 106, the system can use a task library to identify tasks that are similar to a new, unseen task. The identified tasks from the task library can be used to constrain the search space for the new task.

Using these techniques, the learning and generalization framework can effectively and efficiently i) learn to acquire manipulation skills with few iterations (for example 40 or less than 1 hour) training on a real robot and ii) generalize the learned manipulation skills to unseen tasks with few iterations on average.

The primitive learning and generalization framework can be designed to adapt a manipulation policy composed of learnable motion primitives leveraging impedance control; rather than using sparse objective functions. This approach effectively uses a dense objective function from task demonstrations.

The primitive learning and generalization framework can transfer learning methods which retrieves similar tasks from a task library leveraging task meta information and adapting the previously learned parameters to the novel task with few interactions.

For example, the primitive learning and generalization framework can collect various peg-in-hole tasks with diverse geometry shapes and clearances. This framework can acquire and adapt the insertion skills at practically acceptable time costs, (for example 1 hour and 15 minutes), while achieving higher task success rates.

The primitive learning and generalization framework can encode the prior relevant task experience and reduce the parameter exploration space during primitive learning on a novel task. This provides several benefits including: learning and generalization framework can be more data-efficient and interpretable for manipulation tasks.

Impedance control is used to render the robot as a mass-spring-damping system following the dynamics below, where M, D, K are the desired mass, damping, and stiffness matrices, and $F_{ext}$ denotes the external wrench. $\ddot{x}_d$, $\dot{x}_d$, $x_d$ are the desired Cartesian acceleration, $$M(\ddot{x}-\ddot{x}_d)+D(\dot{x}-\dot{x}_d)+K(x-x_d)=-F_{ext}$$

velocity, and position of the end-effector, and $\ddot{x}$, $\dot{x}$, $x$ are the current values correspondingly.

$$\tau=J(q)^T F$$

$$F=-K(x-x_d)-D\dot{x}+g(q)$$

This assumes a small velocity in the tasks and sets $\ddot{x}$, $\dot{x}$ to 0, thus arriving at this control law, where $\tau$ is the control torque, F is a possible tool, J(q) is the Jacobian, and g(q) is the gravity compensation force. However, the values for $\ddot{x}$, $\dot{x}$, $x$ are variable and may be changed based on the application.

Throughout a manipulation task, there is a desired trajectory and a variable impedance to guide the robot movement. In favor of stability and ease of learning, an embodiment uses a diagonal stiffness matrix $K=\text{Diag}[K_x, K_y, K_z, K_{roll}, K_{pitch}, K_{yaw}]$, and a damping matrix D is scaled such that the system is critically damped.

In summary, this manipulation policy output $\alpha_t \in A$ fed to the impedance controller can be composed of a desired end-effector pose $x_d$ and the diagonal elements of the stiffness matrix. The input to the policy $s_t \in S$ consists of end-effector pose $x_t$ and the sensed tool $f_t$, and extensible to more modalities such as RGB and other depth images.

The manipulation policy includes a state machine with state-dependent motion primitives. Each motion primitive $P_m$ associated with the m-th state defines a desired trajectory $f_{\theta m}(x_{enter}; \tau)$, an exit condition checker $h_{\theta m}(\cdot): S \rightarrow \{1, 0\}$, and a 6-dimensional stiffness vector $k_m$. $\theta_m$ contains all the learnable parameters in the primitive $P_m$. $x_{enter}$ denotes the end-effector pose upon entering the m-th state. $\tau$ contains the task information such as the 6 DOF poses of the peg and the hole; often, the hole pose defines the task frame of the motion primitives.

Figure 2:
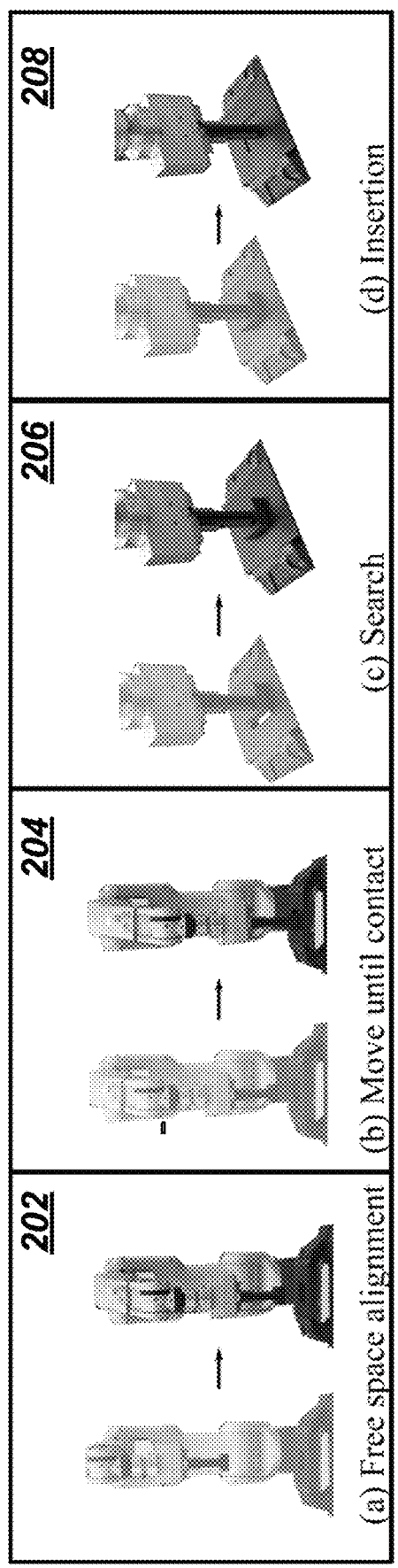
FIG. 2 illustrates example motion primitives designed for peg-in-hole tasks. It shows the start and the end states of the robot for each primitive.

FIG. 2 illustrates an example of the four motion primitives used in an embodiment using peg-in-hole tasks. The first is free space alignment in which the robot moves to the general work space. Second, the robot moves until physical contact is made. Third, there are iterative steps conducted to search for the exact alignment. Fourth, is when the alignment is met and the part is inserted. These steps may be conducted in a different order or may be eliminated entirely based on the application.

During free space alignment 202, the end-effector moves to an initial alignment pose.

$f_{\theta 1}=u(x_{enter}, x_{target})$, $h_{\theta 1}(s_t)=\mathbb{I}[\|x_t-x_{target}\|_2<\sigma]$, $k_1=k_{max}$, where $\mathbb{I}[\cdot]$ is an indicator function mapping the evaluated condition to $\{0; 1\}$. $u(\cdot, \cdot)$ generates a linearly interpolated motion profile from the first to the second pose provided. The target end-effector pose $x_{target}$ is extracted from the task information $\tau$ as $x_{target}=x_{target}=T_{Hole}^{Base} \cdot T_{peg}^{hole} \cdot T_{ee}^{peg}$, where $T_{hole}^{base}$ and $T_{ee}^{peg}$ denote the detected hole pose in the robot base frame and the end-effector pose in the peg frame. $T_{peg}^{hole}$ is the desired peg pose in hole frame when the peg is above and coarsely aligned with the hole. $k_{max}$ denotes a 6-dimensional vector composed of the highest stiffness values along each axis. $\sigma$ is a predefined threshold to determine if the robot arrives at the desired pose. No learnable parameters exist in this primitive. The parameters in this 1st primitive involve $\theta_1=\{\emptyset\}$.

During the move until contact 204 phase, the end-effector moves towards the hole until the peg is in contact with the hole top surface.

$f_{\theta 2}=u(x_{enter}, x_{enter}-[0\ 0\ \delta 0\ 0\ 0]^T)$, $h_{\theta 2}(s_t)=\mathbb{I}[f_{t,z}>\eta]$, $k_2=k_{max}$. $\delta$ is the desired displacement along the z-axis in the task frame, $f_{t,z}$ is the sensed force along the z-axis at time t, and $\eta$ is the exit force threshold. Therefore the parameters defining this 2-nd primitive consists of $\theta_2=\{\delta, \eta\}$.

During the searching 206 phase, the robot searches for the location of the hole while keeping contact with the hole until the peg and the hole are perfectly aligned. After empirical comparisons with alternatives including the commonly used spiral search, we choose the Lissajous curve as the searching pattern, which gives the most reliable performance. While searching for the translation alignment, the peg simultaneously rotates along the z-axis to address the yaw orientation error. The roll and pitch orientation errors are expected to be corrected by the robot being compliant to the environment with the learned stiffness.

$$f_{\theta_3}(t) = x_{enter} + \begin{bmatrix} A\sin(2\pi a \frac{n_1}{T} t) \\ B\sin(2\pi b \frac{n_1}{T} t) \\ -\gamma \\ 0 \\ 0 \\ \varphi\sin(2\pi \frac{n_2}{T} t) \end{bmatrix}, h_{\theta_2}(s_t) = \mathbb{1}[x_{enter,z} - x_{t,z} > \zeta],$$

$$k_3 = k_{search},$$

where a=7; b=6 are the Lissajous numbers selected and T is the cycle period in Lissajous search, 'φ is the maximum tolerated yaw error of the estimated hole pose, set as 6 degree in our experiments. The learnable parameters of this primitive are $$\theta = \left\{A, B, \frac{n_1}{T}, \frac{n_2}{T}, \gamma, \zeta, k_{search}\right\}.$$

During the insertion 208 phase, the peg is inserted into the hole in a compliant manner.

$$f_{\theta 4} = u(x_{enter}, x_{enter} - [0\ 0\ \lambda\ 0\ 0\ 0]^T), h_{\theta a} = I[\text{success condition}], |k_4 = k_{insertion},$$

Where the success condition is provided by the task information T, e.g., $|x_t - x_{success}|_2 \leq \epsilon$. The primitive parameters to learn are $\theta_4 = \lambda_4 = \{\lambda, k_{insertion}\}$.

In this section, we illustrate how to learn the primitive parameters $\Theta = \{\theta_1, \theta_2, \theta_3, \theta_4\}$. The core idea is using Bayesian Optimization (BO) to optimize a task-relevant objective function J(•). The objective function used can simply be the measured task execution time. This is a way to find a feasible region initially, especially when the primitive parameter space is large. The framework utilizes a dense objective function that measures the likelihood of the induced execution trajectory. This likelihood of the induced execution trajectory is being sampled from the distribution of successful task demonstrations $\varepsilon_D = \{\xi_i\}(i=1, 2, \ldots, M)$. Assuming the trajectories are Markovian, a trajectory rollout $\xi = [x_0, x_1, \ldots x_{n-1}]$ is modeled according to:

In order to learn $p(x_i|x_{i-1})$ from demonstrations, a Guassian Mixture Model (GMM) can be used to model the joint probability as $$p\left(\begin{bmatrix} x_i \\ x_{i-1} \end{bmatrix}\right) = \sum_{j=1}^{K} \phi_j N(\mu_j, \Sigma_j),$$

where $\Sigma_{j=1}^{K} \phi_j = 1$ $$p(\xi; \Theta) = p(x_0) \prod_{i=1}^{n-1} p(x_i | x_0, \ldots, x_{i-1}) = p(x_0) \prod_{i=1}^{n-1} p(x_i | x_{i-1}).$$

and K is the number of GMM clusters.

The Gaussian mean is further represented by $\mu_j$ and variance $\Sigma_j$ as:

$$\mu_j = \begin{bmatrix} \mu_j^1 \\ \mu_j^2 \end{bmatrix}, \Sigma_j = [\Sigma_j^{11}\ \Sigma_j^{12}\ \Sigma_j^{21}\ \Sigma_j^{22}].$$

The conditional probability $p(x_{j-1}) = \Sigma_{j=1}^{K} \phi_j N(\mu_j, \Sigma_j)$, can then be calculated where $$\bar{\mu}_j = \mu_j^1 + \Sigma_j^{12}(\Sigma_j^{22})^{-1}(x_{i-1} - \mu_j^2), \bar{\Sigma}_j = \Sigma_j^{11} - \Sigma_j^{12}(\Sigma_j^{22})^{-1}\Sigma_j^{21}.$$

After obtaining the analytical form of $J(\xi) = \log \log p(\xi, \Theta)$, we use BO to solve $\Theta^* = \text{argmax} J(\Theta)$. Expected Improvement (EI) is used as the acquisition function, and we run BO for one or more iterations. The learned parameter $\Theta^*$ that achieves maximum $J(\Theta)$ during N training iterations is selected as the optimal primitive configuration.

When generalizing a task, the framework can leverage prior experience when adapting to a novel insertion task, for example, how to adapt previously learned peg-in-hole policies to different tasks with unseen hole shapes. The adaptation procedure is composed of two core steps: measuring task similarities and transferring similar task policies to unseen shapes.

When measuring task similarity several variables are used. Given an insertion skill library, for example, a set of learned peg insertion policies for different shape $M = \{\pi_1(\Theta_1), \pi_2(\Theta_2), \ldots \pi_n(\Theta_n)\}$, and an unseen shape, the framework must identify which subset of the tasks are most relevant to the new task. While there is a diverse range of auxiliary task information that can be used to measure task similarity, in this example the task similarity is defined as the similarity between the hole cross-section contours. This assumption can change based on the application, but in this example is based on the intuition that similar hole shapes would induce similar policies for insertion. For example, the insertion policies for a square hole and a rectangle hole are likely to be similar, and the optimal policy for a round hole might still work for a hexadecagon hole. The similarity between a shape pair is measured by the Li distance between the two shapes' turning functions. Turning functions are a commonly used representation in shape matching, which represent the angle between the counter-clockwise tangent and the x-axis as a function of the travel distance along a normalized polygonal contour.

Figure 3:
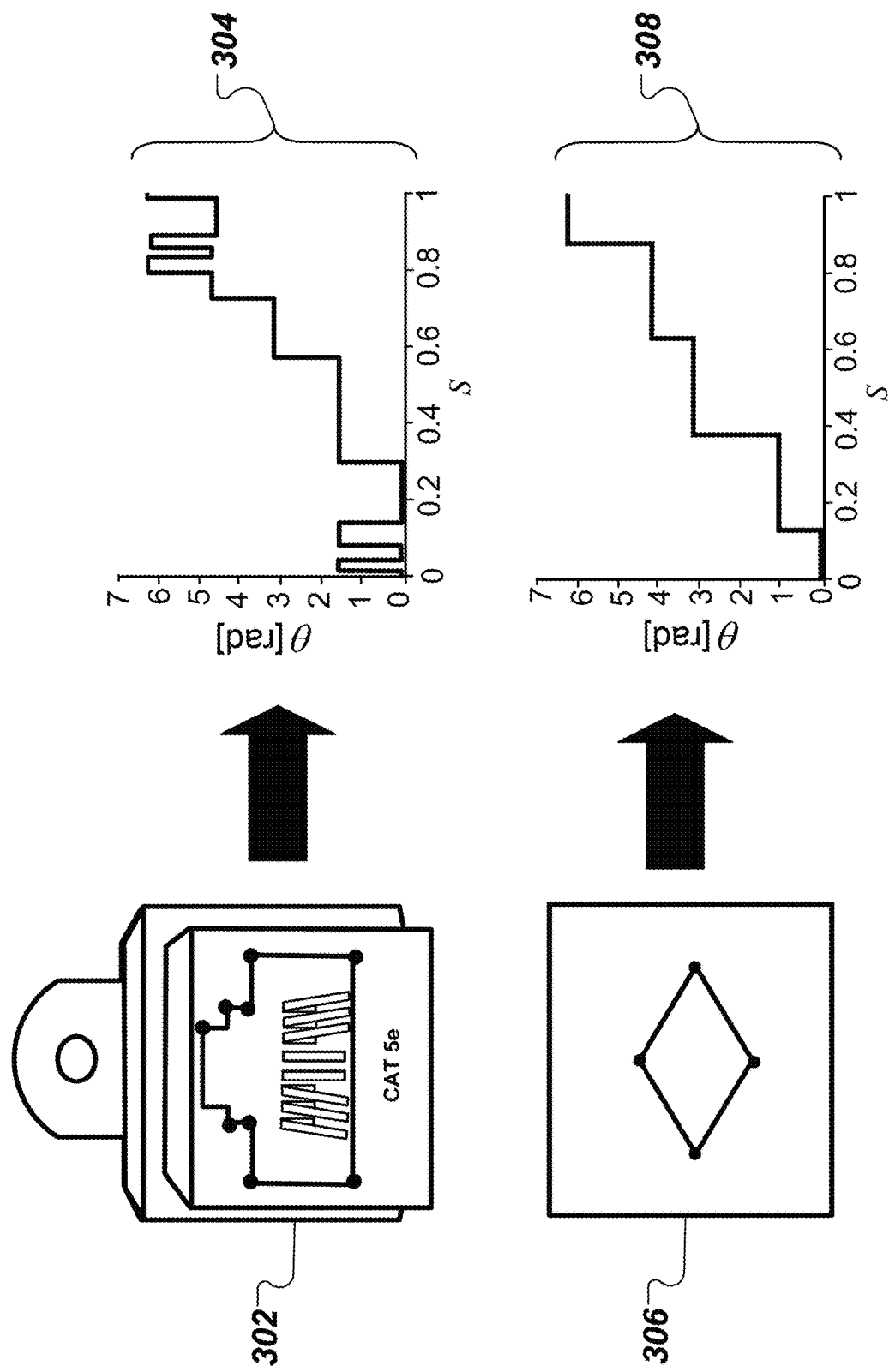
FIG. 3 illustrates examples of two hole's turning functions.

FIG. 3 illustrates two example turning functions. The measured edges of 302 are outputted by means of a turning function and represented in graph b 304. The measured edges of a less complicated connector 306 are outputted by means of a turning function and represented in graph 308. The comparison of graph 304 and graph 308 show the complexity of the shape influences the complexity of the graph.

After obtaining the shape distances of the unseen shape and each shape in the task library, a top shape is chosen that is closest to the unseen shape as the similar shapes. The policies of the similar shapes are then used as input for transfer learning.

Given a novel task, the goal is to efficiently adapt the already learned manipulation policies of the most similar shapes. BO transfer learning can be a multi-task learning problem, here we attempt to learn the search space of BO from the similar task policies and apply it to learning for the new task.

For example, let T={$T_1$, $T_2$, ..., $T_t$} denote the task sets of different hole shapes selected for a proposed application, and F={$J_1$, $J_2$, ..., $J_t$} denote the corresponding objective functions for each task.

$$\min_{l,u} \frac{1}{2} \|u - l\|_2^2 \text{ such that for } 1 \leq i \leq t, l \leq \Theta_i^* \leq u.$$

All the objective functions can initially be defined on a common search space $X \subseteq R^{|\Theta|}$, and it is assumed that the optimal policies for the t tasks {$\pi_1(\Theta_1^*)$, $\pi_2(\Theta_2^*)$, ..., $\pi_t(\Theta_t^*)$}($^*_i \in X$). Given an unseen task $T_{t+1}$, the aim is to learn a new search space from the previous tasks to expedite the new task learning process. The new search space is defined as a function, for example $\underline{X} = \{\Theta \in R^{|\Theta|} | l \leq \Theta \leq u\}$, where l, u are the lower and upper bounds. The new search space $\underline{X} \subseteq X$ can be obtained by solving the constrained optimization problem.

The optimization problem has a closed-form solution:

$$l^* = \min\{\Theta_i^*\}_{i=1}^t, u^* = \max\{\Theta_i^*\}_{i=1}^t.$$

This new search space is then utilized for policy training of this unseen shape task, following the learning of primitive parameters.

The learned objective function can expedite the learning process for motion primitives. In one example, the learned objective function from demonstration is applied for primitive parameter optimization, and compared to the results against primitive optimization by minimizing the measured task execution time. When learning the objective function, the number of GMM clusters can be set to a constant, for example, K=25. The number of BO iterations can also be set to a constant, for example 40 BO iterations can be run. Within each iteration, the current policy is executed twice with independently sampled hole poses. The average objective of the two trials is used as the final objective value consumed by the BO step. The optimal policy is selected as the policy at the BO step when the optimal objective value is achieved, and evaluated by being executed over 20 trials with independently sampled hole poses. The learned dense objective function, i.e., a likelihood function measuring trajectory similarity with respect to demonstrations, provides richer information for primitive learning than sparse signals like task success and completion time.

Figure 4:
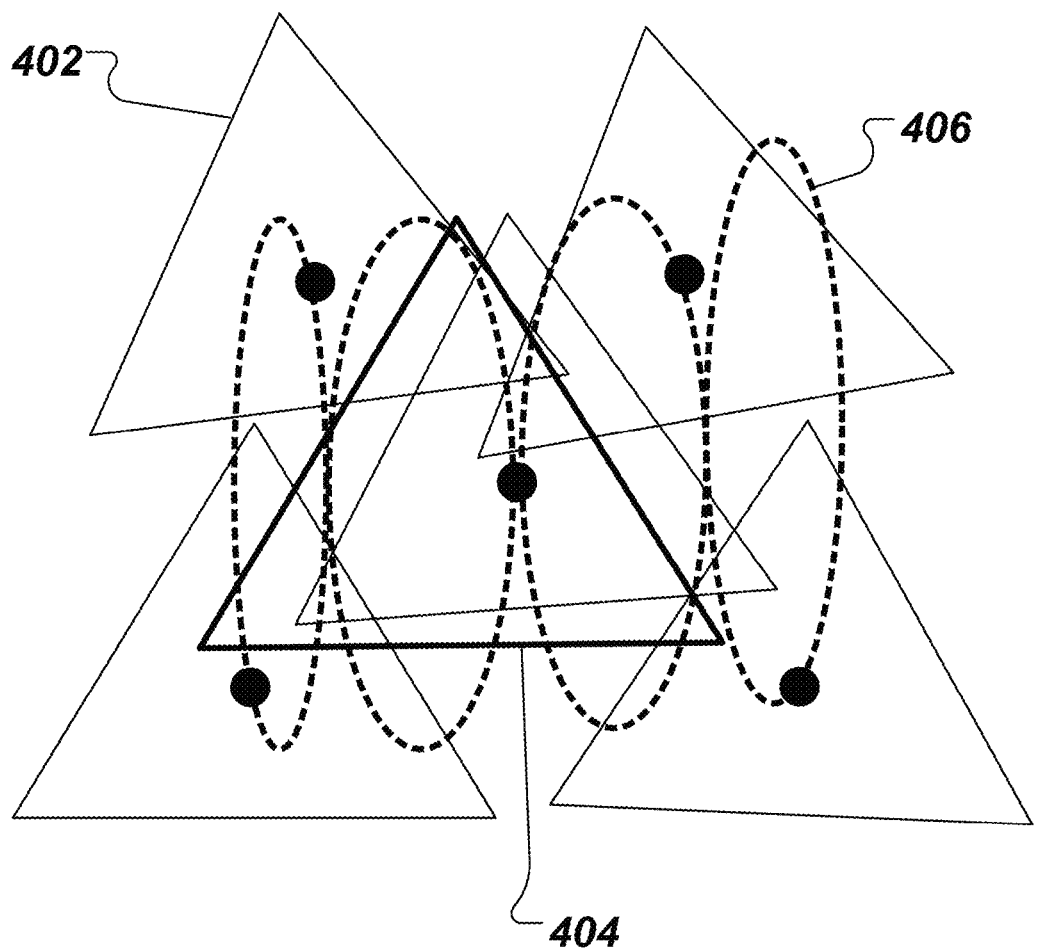
FIG. 4 illustrates a sample search trace.

FIG. 4 illustrates a sample search trace. In this example the triangles 402 represent attempts to insert a triangular connector into a triangle hole 404. The search trace 406 illustrates how a robot will move the connector in order to attempt the insertions. The search trace 406 thoroughly covers the area of the hole 404, and the corresponding parameters should be a reasonable candidate for the desired configuration of the motion primitive. However, some prior art techniques discourage exploration in this search space due to their sparse rewards and due to noise. By contrast, this candidate is expected to be assigned a high objective value by the objective function described in this specification because its trajectory is likely to be quite similar to the parameters from a successful demonstration, e.g., a human demonstration.

The generalization method can transfer these learned tasks to unseen shapes. For example, when presented 1 of the 8 tasks as the task of interest, the learning algorithm has access to all interaction data during policy learning on the other 7 tasks. One embodiment can apply the generalization method to learn a reduced search space using the 3 most similar tasks, within which the primitive parameters are optimized. Compared with LfD where parameters are optimized over the full space, the generalization method can reach a comparable or better success rate, meanwhile achieve the first task completion with significantly lower number of iterations. Another embodiment, considers learning the search space without measuring the task similarities (NoSim), i.e., the new search space is obtained using all the other tasks instead of only the similar ones. Task generalization and similarities outperforms NoSim consistently on all insertion tasks, indicating the significance of finding similar tasks using the task geometry information before learning the new search space.

Figure 5:
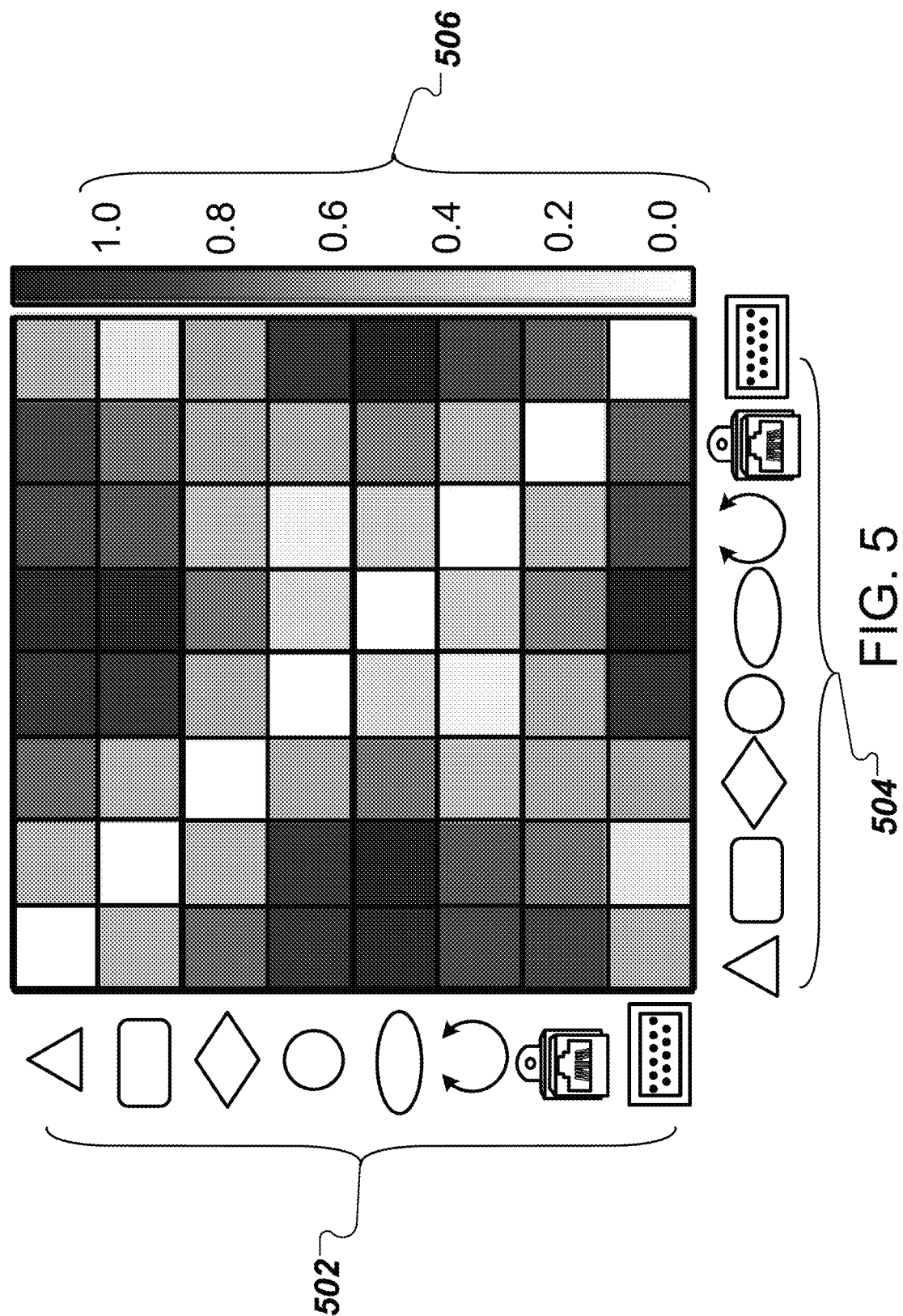
FIG. 5 illustrates example similarity distances between all insertion tasks.

FIG. 5 illustrates an example of the similarity distances between all insertion tasks to qualitatively demonstrate the effectiveness of using the task geometry information. The list of first tasks 502 and list of second tasks 504 are compared and the difference between them is heat mapped on the scale 506. For example, given an unseen waterproof insertion task, the triangle, rectangle and parallelogram shapes are selected with the smallest similarity distances. With such knowledge encoded, in the generalization method, a narrower search space is obtained compared to NoSim, thus leading to better performance by focusing the BO budgets in the parameter subspace with higher chance of task success.

Figure 6:
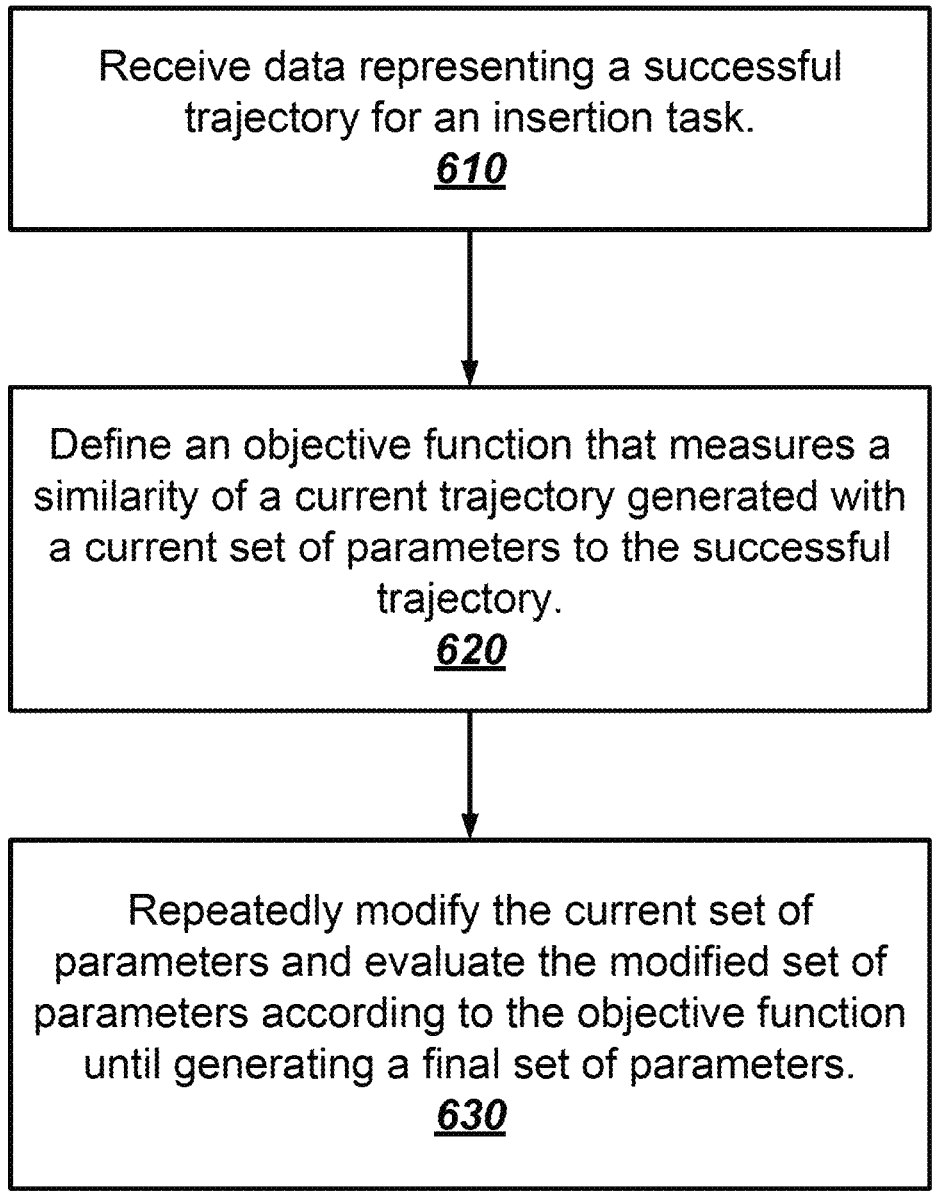
FIG. 6 is a flowchart of an example process for learning generalizable robotic skills in a data-efficient manner.

FIG. 6 is a flowchart of an example process for learning generalizable robotic skills in a data-efficient manner. The process can be performed by a computer system having one or more computers in one or more locations. The process will be described as being performed by a system of one or more computers.

The system receives data representing a successful trajectory for an insertion task (610). For example, the system can utilize a dense objective function that measures the likelihood of the induced execution trajectory. This measures the similarity with respect to demonstrations, provides richer information for primitive learning than sparse signals like task success and completion time. In some implementations, the data representing the successful trajectory is generated from a human demonstration. In some other implementations, the data representing the successful trajectory is generated from an automatically generated motion plan that was successful in a workcell or in simulation.

The system can then perform a parameter optimization process for the robot to perform the insertion task. To do so, the system defines an objective function that measures a similarity of a current trajectory generated with a current set of parameters to the successful trajectory (620). Several different variables can denote the task sets of different hole shapes selected for a proposed application, and a separate set of variables can denote the corresponding objective functions for each task.

The system repeatedly modifies the current set of parameters and evaluates the modified set of parameters according to the objective function until generating a final set of parameters (630). This process can involve taking the difference between the observed parameters and the current parameters. The repeated modification is based on the difference between these values.

In some implementations, the system uses Bayesian Optimization (BO) to optimize a task-relevant objective function. The objective function used can simply be the measured task execution time. In other implementations, a learned objective function from demonstration (LfD) is applied for primitive parameter optimization, and compared to the results against primitive optimization by minimizing the measured task execution time.

The final set of parameters can then be used to generalize other insertion tasks. As part of this process, the system can add the final set of parameters to a task library along with metadata describing the task, e.g., a representation of the connector and the receptacle.

Then, when the system receives a new insertion task, the system can search the task library for similar tasks that have already been optimized for success. In some implementations, the system computes a measure of similarity of receptacles between the new task and tasks in the task library in order to select a task from the task library.

The system can then adapt the new insertion task using the optimized set of parameters generated for the task in the task library. In some implementations, the system uses the optimized set of parameters generated for the task in the task library to constrain the initial search space for the new task. The system can thus leverage the previously learned information about other insertion tasks in a data efficient manner.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A computer-implemented method comprising:
receiving data representing a successful trajectory for an insertion task using a robot to insert a connector into a receptacle;
performing a parameter optimization process for the robot to perform the insertion task including:
defining an objective function that measures a similarity of a current trajectory generated with a current set of parameters to the successful trajectory, and
repeatedly modifying the current set of parameters and evaluating the modified set of parameters according to the objective function until generating a final set of parameters;
adding the final set of parameters to a task library;
receiving a new insertion task;
selecting the final set of parameters based on the new insertion task; and
adapting the new insertion task using the final set of parameters.

2. The method of claim 1, wherein performing the parameter optimization process comprises generating a motion primitive for performing the insertion task.

3. The method of claim 2, further comprising using the one or more generated motion primitives to perform an overall task.

4. The method of claim 1, wherein the data representing the successful trajectory for the insertion task was generated from a human demonstration.

5. The method of claim 4, wherein performing the parameter optimization process modifies parameters of the robot to more closely match the human demonstration.

6. The method of claim 1, wherein performing the parameter optimization process comprises adjusting values for pose, velocity, and force of the robot at each of a plurality of time steps of the current trajectory.

7. The method of claim 1, wherein selecting the final set of parameters based on the new insertion task comprises computing a measure of similarity between the new insertion task and a plurality of insertion tasks represented in the task library.

8. The method of claim 7, wherein the measure of similarity is based on a measure of similarity of receptacle shape.

9. The method of claim 1, wherein adapting the new insertion task using the final set of parameters comprises constraining an initial search space for optimizing the new insertion task for the successful trajectory.

10. A system comprising:
one or more computers and one or more storage devices storing instructions that are operable, when executed by the one or more computers, to cause the one or more computers to perform operations comprising:
receiving data representing a successful trajectory for an insertion task using a robot to insert a connector into a receptacle;
performing a parameter optimization process for the robot to perform the insertion task including:
defining an objective function that measures a similarity of a current trajectory generated with a current set of parameters to the successful trajectory, and
repeatedly modifying the current set of parameters and evaluating the modified set of parameters according to the objective function until generating a final set of parameters;
adding the final set of parameters to a task library;
receiving a new insertion task;
selecting the final set of parameters based on the new insertion task; and
adapting the new insertion task using the final set of parameters.

11. The system of claim 10, wherein performing the parameter optimization process comprises generating a motion primitive for performing the insertion task.

12. The system of claim 11, wherein the operations further comprise using the one or more generated motion primitives to perform an overall task.

13. The system of claim 12, wherein the data representing the successful trajectory for the insertion task was generated from a human demonstration.

14. The system of claim 13, wherein performing the parameter optimization process modifies parameters of the robot to more closely match the human demonstration.

15. The system of claim 10, wherein performing the parameter optimization process comprises adjusting values for pose, velocity, and force of the robot at each of a plurality of time steps of the current trajectory.

16. The system of claim 10, wherein selecting the final set of parameters based on the new insertion task comprises computing a measure of similarity between the new insertion task and a plurality of insertion tasks represented in the task library.

17. The system of claim 16, wherein the measure of similarity is based on a measure of similarity of receptacle shape.

18. The system of claim 10, wherein adapting the new insertion task using the final set of parameters comprises constraining an initial search space for optimizing the new insertion task for the successful trajectory.

19. One or more non-transitory computer storage media encoded with computer program instructions that when executed by one or more computers cause the one or more computers to perform operations comprising:
receiving data representing a successful trajectory for an insertion task using a robot to insert a connector into a receptacle;
performing a parameter optimization process for the robot to perform the insertion task including:
defining an objective function that measures a similarity of a current trajectory generated with a current set of parameters to the successful trajectory, and
repeatedly modifying the current set of parameters and evaluating the modified set of parameters according to the objective function until generating a final set of parameters;
adding the final set of parameters to a task library;
receiving a new insertion task;
selecting the final set of parameters based on the new insertion task; and
adapting the new insertion task using the final set of parameters.

20. The computer storage media of claim 19, wherein performing the parameter optimization process comprises adjusting values for pose, velocity, and force of the robot at each of a plurality of time steps of the current trajectory.

21. The computer storage media of claim 19, wherein the data representing the successful trajectory for the insertion task was generated from a human demonstration.

* * * * *